(12) United States Patent  (10) Patent No.: US 8,988,345 B2
Ackerman et al.  (45) Date of Patent: Mar. 24, 2015

(54) ADAPTIVE EVENT RECOGNITION

(71) Applicants: Nathan Ackerman, Seattle, WA (US); Mark J. Finocchio, Redmond, WA (US); Andrew Bert Hodge, Palo Alto, CA (US)

(72) Inventors: Nathan Ackerman, Seattle, WA (US); Mark J. Finocchio, Redmond, WA (US); Andrew Bert Hodge, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/927,051

(22) Filed: Jun. 25, 2013

(65) Prior Publication Data

US 2014/0375545 A1 Dec. 25, 2014

(51) Int. Cl.
*G09G 5/00* (2006.01)
*G06F 3/03* (2006.01)

(52) U.S. Cl.
CPC ........................................ *G06F 3/03* (2013.01)
USPC .................... 345/156; 345/7; 345/8; 345/158

(58) Field of Classification Search
CPC ......... G06F 3/012; G06F 3/013; G06F 3/017; G06F 3/0482; G06F 3/0484
USPC .......................................... 345/7–9, 156–166
See application file for complete search history.

(56) References Cited

U.S. PATENT DOCUMENTS

| 5,784,601 | A |   | 7/1998 | Kisaichi |
| 6,127,900 | A | * | 10/2000 | Laub et al. ................... 331/179 |
| 6,359,601 | B1 | * | 3/2002 | Maguire, Jr. ...................... 345/7 |
| 7,971,156 | B2 |   | 6/2011 | Albertson et al. |
| 2008/0126284 | A1 |   | 5/2008 | Forbes et al. |
| 2011/0320949 | A1 |   | 12/2011 | Ohki et al. |
| 2012/0225719 | A1 |   | 9/2012 | Nowozin et al. |
| 2013/0077820 | A1 |   | 3/2013 | Marais et al. |
| 2013/0114380 | A1 |   | 5/2013 | Bryger et al. |

FOREIGN PATENT DOCUMENTS

WO 2013021385 A2 2/2013

OTHER PUBLICATIONS

Farra, et al., "Energy-Efficient Mobile Gesture Recognition with Computation Offloading", Retrieved at: <<http://ieeexplore.ieee.org/stamp/stamp.jsp?tp=&arnumber=6403626>>, In Proceedings of: International Conference on Energy Aware Computing, Dec. 2, 2011, pp. 6.

(Continued)

*Primary Examiner* — Vijay Shankar
(74) *Attorney, Agent, or Firm* — Miia Sula; Judy Yee; Micky Minhas (57) ABSTRACT

A system and related methods for adaptive event recognition are provided. In one example, a selected sensor of a head-mounted display device is operated at a first polling rate corresponding to a higher potential latency. Initial user-related information is received. Where the initial user-related information matches a pre-event, the selected sensor is operated at a second polling rate faster than the first polling rate and corresponding to a lower potential latency. Subsequent user-related information is received. Where the subsequent user-related information matches a selected target event, feedback associated with the selected target event is provided to the user via the head-mounted display device.

20 Claims, 7 Drawing Sheets

(56) References Cited

OTHER PUBLICATIONS

Raffa, et al., "Don't Slow Me Down: Bringing Energy Efficiency to Continuous Gesture Recognition", Retrieved at: <<http://ieeexplore.ieee.org/stamp/stamp.jsp?tp=&arnumber=5665872>>, In Proceedings of: International Symposium on Wearable Computers, Oct. 13, 2010, pp. 8.

Grobekathofer, et al., "Low Latency Recognition and Reproduction of Natural Gesture Trajectories", Retrieved at: <<http://www.techfak.uni-bielefeld.de/~asadeghi/pub/Gro%C3%9FekathoeferEtAl2012.pdf>>, In Proceedings of: International Conference on Pattern Recognition Applications and Methods, Feb. 8, 2012, pp. 8.

Fothergill, et al., "Instructing People for Training Gestural Interactive Systems", Retrieved at: <<http://research.microsoft.com/en-us/um/people/pkohli/papers/fmkn_chi2012.pdf>>, In Proceedings of: Computer Human Interaction, May 12, 2012, pp. 10.

ISA European Patent Office, International Search Report and Written Opinion Issued in Application No. PCT/US2014/043307, Sep. 17, 2014, 13 pages.

* cited by examiner

ADAPTIVE EVENT RECOGNITION

BACKGROUND

In user interface systems, minimizing latency experienced by the user between a user input and the system's response to the input creates a more natural and enjoyable user experience. In augmented reality systems, for example, reducing such latency provides a higher quality and more realistic augmented reality experience. In some augmented reality systems, one or more sensors may receive user input that triggers a system response. To monitor for such user input the system may periodically poll the sensors for input. Sampling latency corresponding to the polling frequency can be a significant source of user perceived latency.

Additionally and with respect to portable and other battery powered devices, conserving power usage and corresponding battery life may also be considerations. While utilizing high sensor sampling rates at all times may reduce sampling latency, this also undesirably consumes more power and reduces battery life. On the other hand, while utilizing low sampling rates may reduce power usage and increase battery life, such low sampling rates also increase latency.

SUMMARY

Various embodiments are disclosed herein that relate to systems and methods for recognizing a selected target event. For example, one disclosed embodiment provides a method that includes, in a display device comprising a plurality of sensors, operating a selected sensor at a first polling rate corresponding to a higher potential latency. Initial user-related information from the selected sensor is received. The method includes determining whether the initial user-related information matches one of a plurality of pre-events, wherein each of the pre-events corresponds to one or more different patterns of pre-events, and each of the patterns leads to a different possible target event.

Where the initial user-related information matches one of the plurality of pre-events, the method includes operating the selected sensor at a second polling rate that is faster than the first polling rate and that corresponds to a lower potential latency that is less than the higher potential latency. Subsequent user-related information from the selected sensor is received. Where the subsequent user-related information matches the selected target event from among the different possible target events, feedback associated with the selected target event is provided to the user via the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
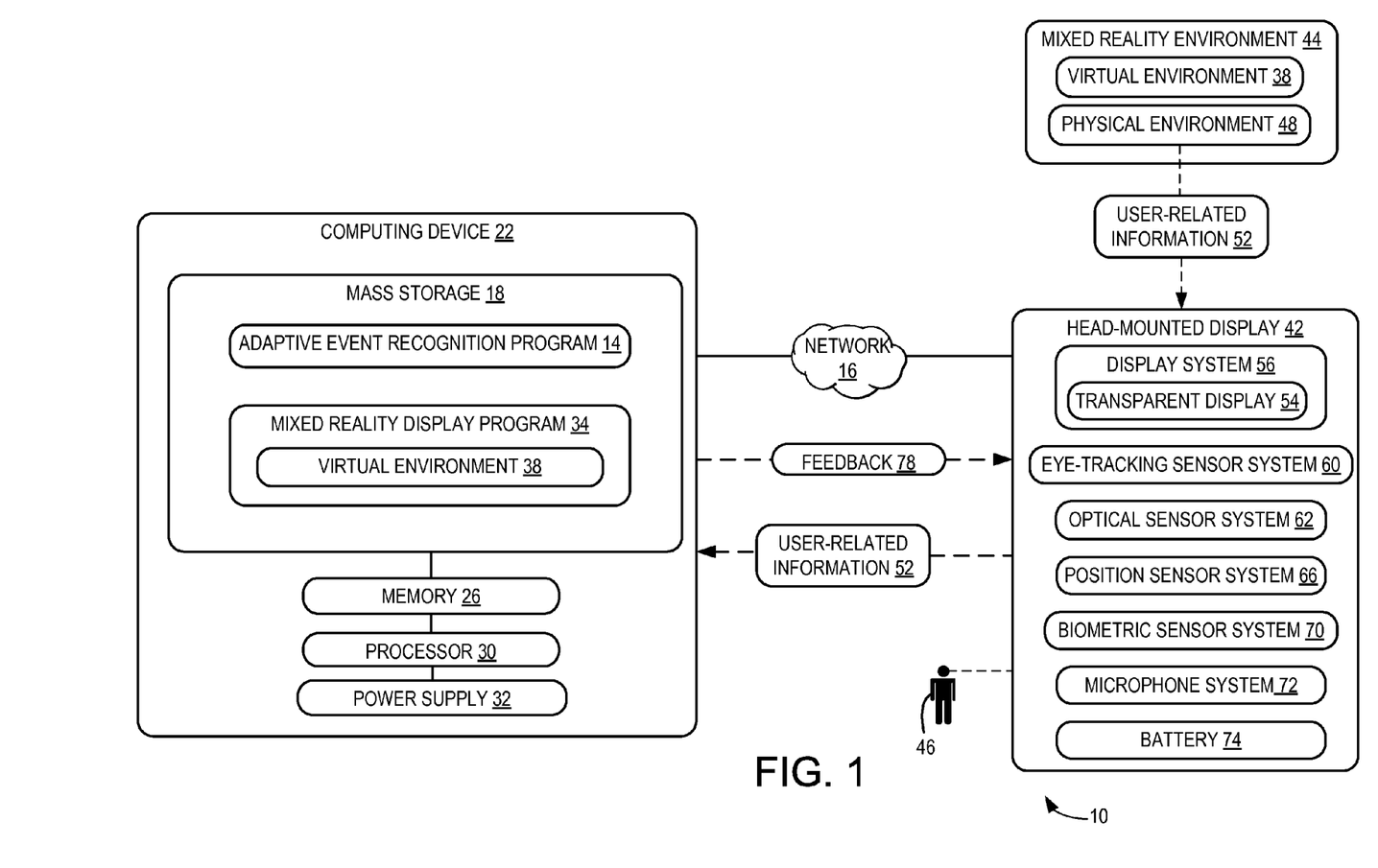
FIG. 1 is a schematic view of an adaptive event recognition system according to an embodiment of the present disclosure.

FIG. 1 shows a schematic view of one embodiment of an adaptive event recognition system 10. The adaptive event recognition system 10 includes an adaptive event recognition program 14 that may be stored in mass storage 18 of a computing device 22. The adaptive event recognition program 14 may be loaded into memory 26 and executed by a processor 30 of the computing device 22 to perform one or more of the methods and processes described in more detail below. The computing device 22 may further include a power supply 32, such as a battery, for supplying power to components of the computing device.

The adaptive event recognition system 10 includes a mixed reality display program 34 that may generate a virtual environment 38 for display via a display device, such as the head-mounted display (HMD) device 42, to create a mixed reality environment 44. The mixed reality environment includes the virtual environment 38 displayed within a physical environment 48. As described in more detail below, user-related information 52 may be received from the physical environment 48 via the HMD device 42.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 7.

The computing device 22 may be operatively connected with the HMD device 42 using a wired connection, or may employ a wireless connection via WiFi, Bluetooth, or any other suitable wireless communication protocol. For example, the computing device 22 may be communicatively coupled to a network 16. The network 16 may take the form of a local area network (LAN), wide area network (WAN), wired network, wireless network, personal area network, or a combination thereof, and may include the Internet.

The computing device 22 may also communicate with one or more other computing devices via network 16. Additionally, the example illustrated in FIG. 1 shows the computing device 22 as a separate component from the HMD device 42. It will be appreciated that in other examples the computing device 22 may be integrated into the HMD device 42.

Figure 2:
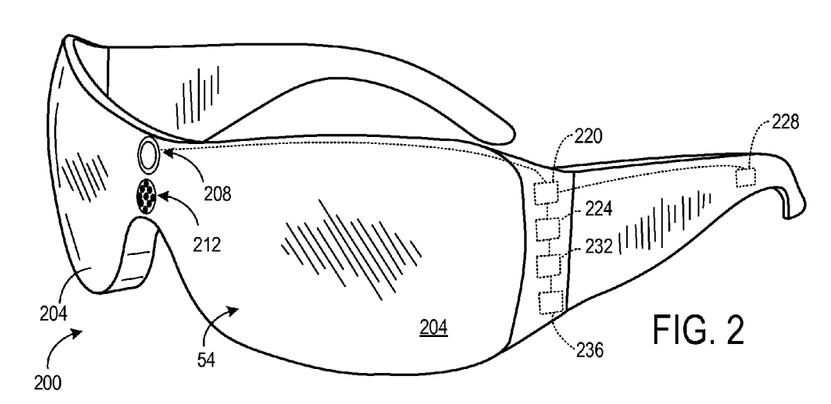
FIG. 2 shows an example head-mounted display device according to an embodiment of the present disclosure.

With reference now also to FIG. 2, one example of an HMD device 200 in the form of a pair of wearable glasses with a transparent display 54 is provided. It will be appreciated that in other examples, the HMD device 200 may take other suitable forms in which a transparent, semi-transparent or non-transparent display is supported in front of a viewer's eye or eyes. It will also be appreciated that the HMD device 42 shown in FIG. 1 may take the form of the HMD device 200, as described in more detail below, or any other suitable HMD device. Additionally, many other types and configurations of display devices having various form factors may also be used within the scope of the present disclosure. Such display devices may include hand-held smart phones, tablet computers, and other suitable display devices.

With reference to FIGS. 1 and 2, the HMD device 42 includes a display system 56 and transparent display 54 that enable images such as holographic objects to be delivered to the eyes of a user 46. The transparent display 54 may be configured to visually augment an appearance of a physical environment 48 to a user 46 viewing the physical environment through the transparent display. For example, the appearance of the physical environment 48 may be augmented by graphical content (e.g., one or more pixels each having a respective color and brightness) that is presented via the transparent display 54 to create a mixed reality environment.

The transparent display 54 may also be configured to enable a user to view a physical, real-world object in the physical environment 48 through one or more partially transparent pixels that are displaying a virtual object representation. As shown in FIG. 2, in one example the transparent display 54 may include image-producing elements located within lenses 204 (such as, for example, a see-through Organic Light-Emitting Diode (OLED) display). As another example, the transparent display 54 may include a light modulator on an edge of the lenses 204. In this example the lenses 204 may serve as a light guide for delivering light from the light modulator to the eyes of a user. Such a light guide may enable a user to perceive a 3D holographic image located within the physical environment 48 that the user is viewing, while also allowing the user to view physical objects in the physical environment, thus creating a mixed reality environment 44.

The HMD device 42 may also include various sensors and related systems. For example, the HMD device 42 may include an eye-tracking system 60 that utilizes at least one inward facing sensor 208. The inward facing sensor 208 may be an image sensor that is configured to acquire image data in the form of eye-tracking data from a user's eyes. Provided the user has consented to the acquisition and use of this information, the eye-tracking system 60 may use this information to track a position and/or movement of the user's eyes.

In one example, the eye-tracking system 60 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes. In some examples, eye-tracking system 60 may also be employed as a user input device for providing user-related information 52, such that a user may interact with the HMD device 42 via movements of the user's eyes.

The HMD device 42 may also include sensor systems that receive physical environment data, such as user-related information 52, from the physical environment 48. For example, the HMD device 42 may include an optical sensor system 62 that utilizes at least one outward facing sensor 212, such as an optical sensor, to capture image data from the physical environment 48. Outward facing sensor 212 may detect movements within its field of view, such as gesture-based inputs or other movements performed by a user 46 or by a person or physical object within the field of view. Outward facing sensor 212 may also capture two-dimensional image information and depth information from physical environment 48 and physical objects within the environment. For example, outward facing sensor 212 may include a depth camera, a visible light camera, an infrared light camera, and/or a position tracking camera.

The HMD device 42 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor 212 may capture images of the physical environment 48 in which a user 46 is situated. In one example, the mixed reality display program 34 may include a 3D modeling system that uses such input to generate a virtual environment 38 that models the physical environment 48 surrounding the user 46.

The HMD device 42 may also include a position sensor system 66 that utilizes one or more motion sensors 220 to capture position data, and thereby enable motion detection, position tracking and/or orientation sensing of the HMD device. For example, the position sensor system 66 may be utilized to determine a direction, velocity and/or acceleration of a user's head. The position sensor system 66 may also be utilized to determine a head pose orientation of a user's head. In one example, position sensor system 66 may comprise an inertial measurement unit configured as a six-axis or six-degree of freedom position sensor system. This example position sensor system may, for example, include three accelerometers and three gyroscopes to indicate or measure a change in location of the HMD device 42 within three-dimensional space along three orthogonal axes (e.g., x, y, z), and a change in an orientation of the HMD device about the three orthogonal axes (e.g., roll, pitch, yaw).

Position sensor system 66 may also support other suitable positioning techniques, such as GPS or other global navigation systems. Further, while specific examples of position sensor systems have been described, it will be appreciated that other suitable position sensor systems may be used. In some examples, motion sensors 220 may also be employed as user input devices for providing user-related information 52, such that a user may interact with the HMD device 42 via gestures of the neck and head, or even of the body.

The HMD device 42 may also include a biometric sensor system 70 that utilizes one or more biometric sensors 232 to capture user biometric data. For example, the biometric sensor system 70 may be utilized to measure or determine user biometric data including, for example, heart rate, pupillary response, hemoglobin saturation, skin conductivity, respiration, perspiration, and brainwave activity.

The HMD device 42 may also include a microphone system 72 that includes one or more microphones 224 that capture audio data. In other examples, audio may be presented to the user via one or more speakers 228 on the HMD device 42. The first HMD device 42 may also include a battery 74 or other suitable portable power supply that provides power to the various components of the HMD device.

The HMD device 42 may also include a processor 236 having a logic subsystem and a storage subsystem, as discussed in more detail below with respect to FIG. 7, that are in communication with the various sensors and systems of the HMD device. In one example, the storage subsystem may include instructions that are executable by the logic subsystem to receive signal inputs from the sensors and forward such inputs to computing device 22 (in unprocessed or processed form), and to present images to a user via the transparent display 54.

It will be appreciated that the HMD device 42 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 42 may include additional and/or alternative sensors, cameras, microphones, input devices, output devices, etc. without departing from the scope of this disclosure. Further, the physical configuration of the HMD device 42 and its various sensors and subcomponents may take a variety of different forms without departing from the scope of this disclosure.

Also and as discussed in more detail below, it will be appreciated that the various sensor systems and related components may be operated at various polling rates or frequencies to monitor for user-related information 52 provided by user 46. As described in more detail below, the polling rates of one or more sensors may be controlled in response to determining whether user-related information 52 matches a pre-event.

Figure 3:
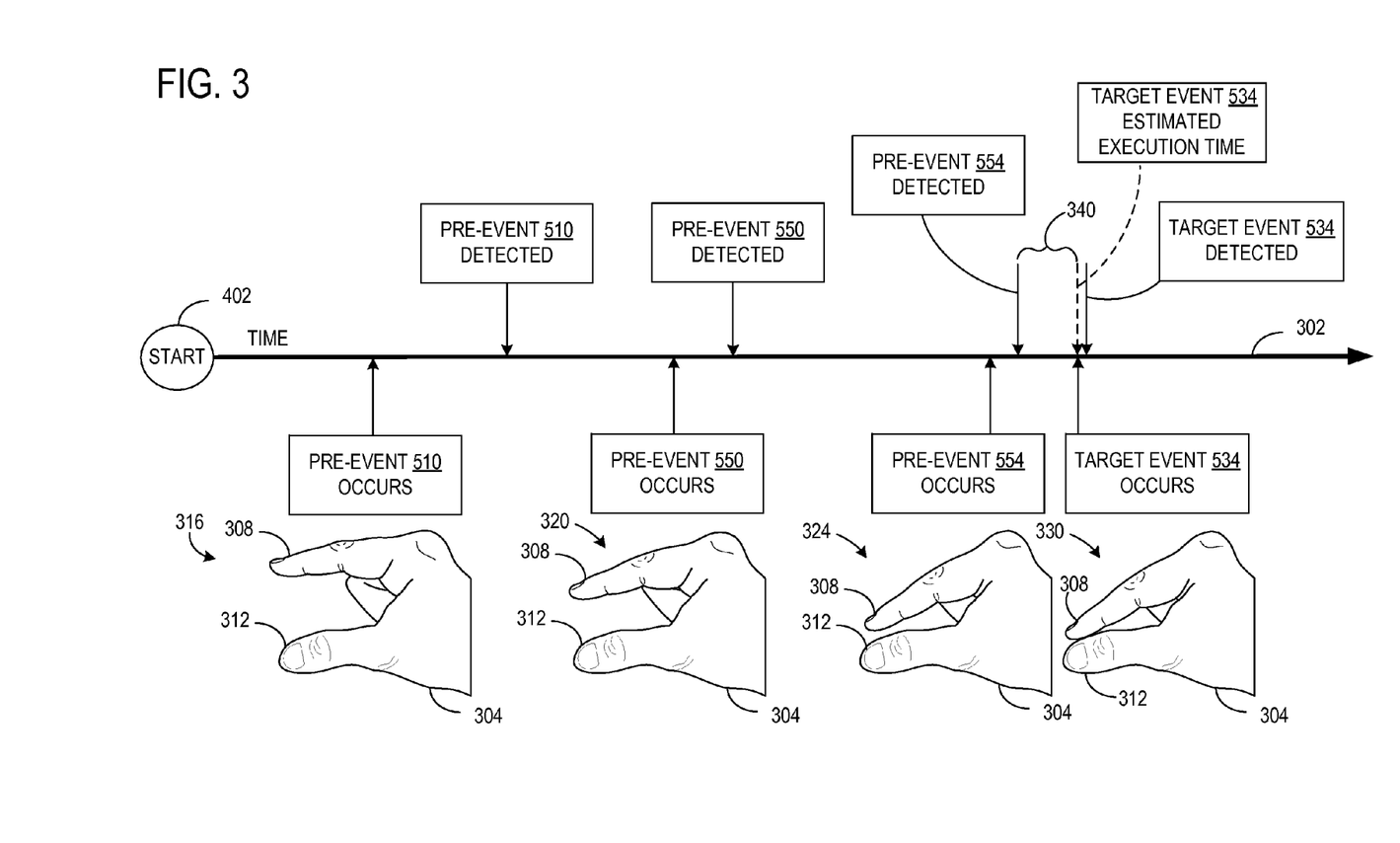
FIG. 3 is a schematic illustration of pre-events in the form of hand movements leading to a selected target event.
Figure 4:
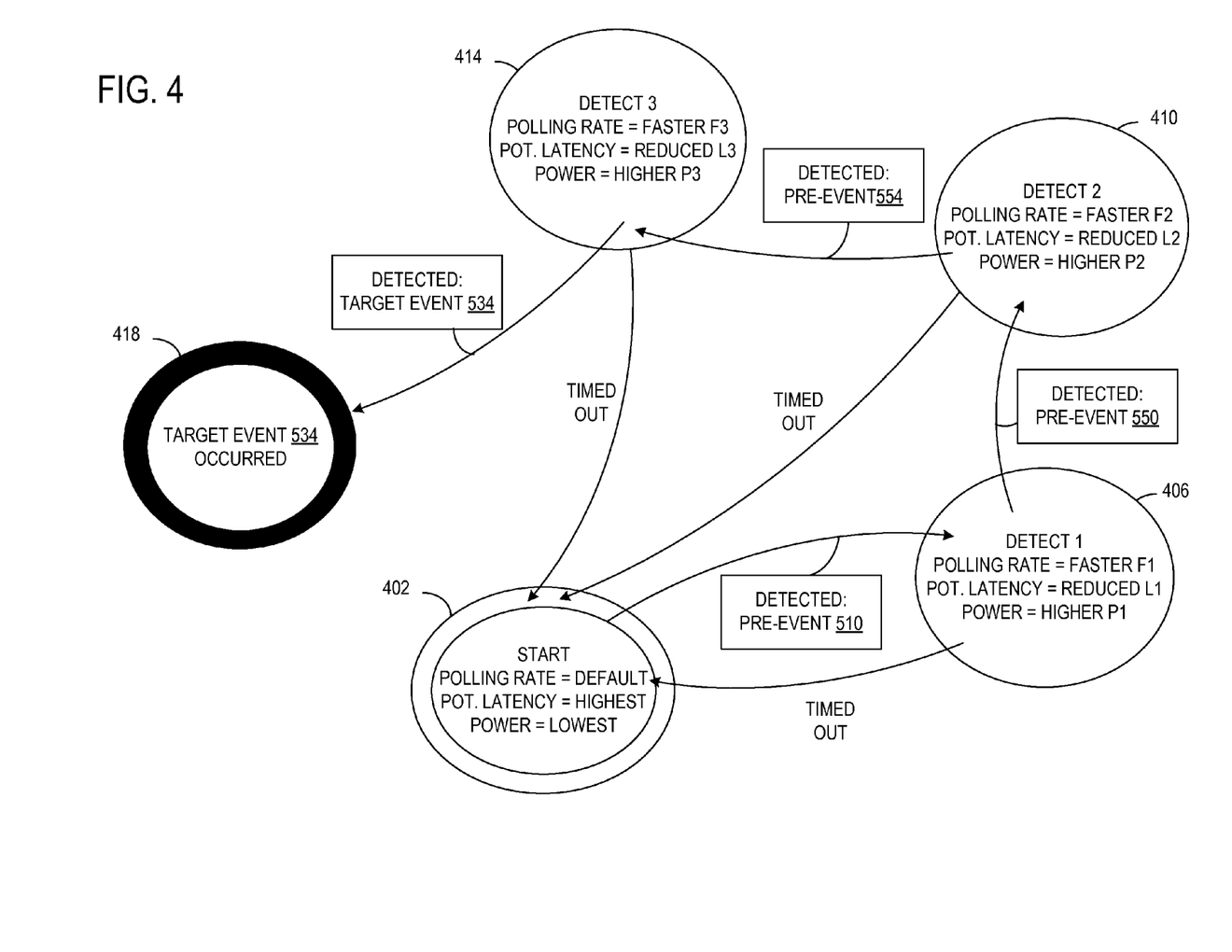
FIG. 4 is a schematic illustration of the pre-events of FIG. 3 being detected and a sensor polling rate being controlled according to an embodiment of the present disclosure.
Figure 5:
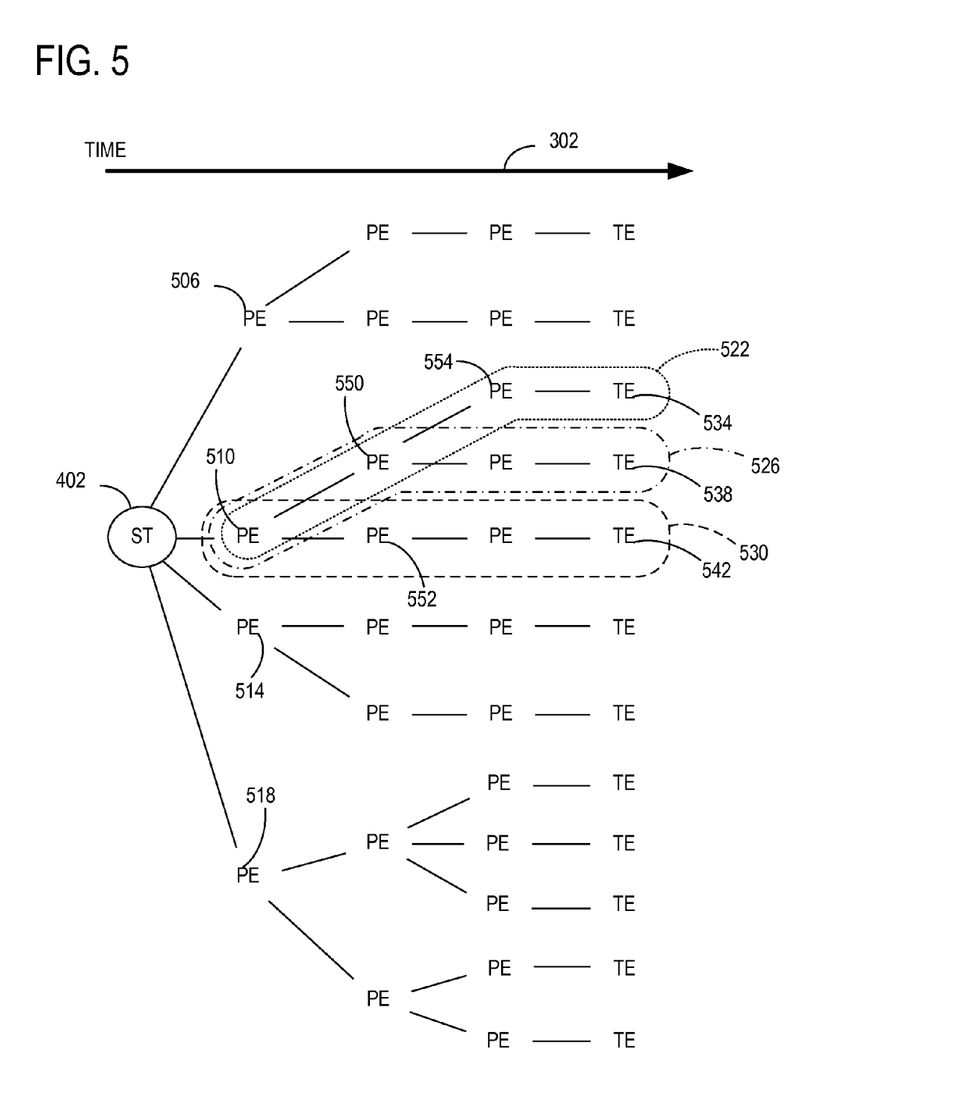
FIG. 5 is a schematic illustration of a plurality of patterns of pre-events leading to different possible target events.

With reference now to FIGS. 3-5, descriptions of example use cases and embodiments of the adaptive event recognition system 10 will now be provided. In the examples that follow, user-related information 52 in the form of hand movements and corresponding gestures are received by the optical sensor system 62. It will be appreciated that in other examples many other forms of user-related information 52 may be received and utilized by the adaptive event recognition system 10 to control sensor operation as described in more detail below. Such other forms of user-related information 52 include, but are not limited to, other user movement data, eye-tracking data, position data, biometric data and audio data.

FIG. 3 is a schematic illustration of pre-events in the form of hand movements leading to a selected target event comprising a target gesture. In the example shown in FIG. 3, one or more optical sensors in the optical sensor system 62 of HMD device 42 may capture image data of a user's hand 304 executing a hand gesture. In this example, the index finger 308 and thumb 312 make a pinching gesture in which the user begins with the finger and thumb forming an open, generally U-shaped pose 316. From this pose 316 the user closes the gap between the index finger 308 and thumb 312 until the finger and thumb meet to make a pinching pose 330.

In one example and as described in more detail below, upon detecting that the user has completed the pinching gesture by bringing together the index finger 308 and thumb 312 into the pinching pose 330, the adaptive event recognition system 10 may provide feedback 78 to the user 46 via the HMD device 42. Feedback 78 may comprise, for example, the execution of a command with respect to a program running via the HMD device 42. For example, the pinching gesture illustrated in FIG. 3 may be used by a photography application to capture a photo of the physical environment 48. In this example the feedback 78 may also include an indication to the user that a photo has been captured, such as providing a shutter release sound, a flashing icon, etc., via the HMD device 42.

In other examples feedback 78 may comprise any other command utilized in a user input context, such as selecting, copying or pasting an element displayed to the user via HMD device 42. In other examples, the command may control an operational aspect of the HMD device 42 or other electronic device. It will be appreciated that the foregoing examples are merely illustrative, and that feedback 78 may comprise any command, action, notification, or other event that is associated with a selected target event, such as a target gesture, and is provided to a user.

As noted above, to provide a realistic and believable user experience, any latency between a user input such as a target gesture and the associated feedback is desirably minimized. However, minimizing latency may include continually operating sensors at a high polling rates that use more power, impose greater computational burdens and correspondingly reduce battery life. Advantageously and as described in more detail below, the adaptive event recognition system 10 may reduce latency while also minimizing power usage and computational burden, thereby enabling enhanced battery life.

With reference also to FIGS. 4 and 5, in one example the adaptive event recognition program 14 may be configured to receive user-related information 52 comprising image data from the optical sensor system 62 showing the user's hand 304 in a variety of poses, including the poses shown in FIG. 3. As shown in FIGS. 3 and 4, from a Start state 402 corresponding to a point in time, the adaptive event recognition program 14 may be configured to operate a selected sensor from the optical sensor system 62 at a default polling rate that corresponds to a highest potential latency. The default polling rate may be, for example, 0.5 Hz., 1.0 Hz., 5.0 Hz., or any other suitable frequency. Such default polling rate may also correspond to a lowest power consumption state of the selected sensor.

The selected sensor operating at the default polling rate may receive user-related information 52, such as image data of the user's hand 304, and provide such information to the adaptive event recognition program 14. The adaptive event recognition program 14 may then determine whether such information matches one of a plurality of pre-events (PE). With reference now to the example shown in FIG. 5, from the Start state 402 the adaptive event recognition program 14 may determine whether user-related information 52 matches PE 506, PE 510, PE 514 or PE 518. As shown in FIG. 5, each of the pre-events PE 506, PE 510, PE 514 and PE 518 corresponds to one or more different patterns of pre-events, and each of the patterns leads to a different possible target event (TE). For example, PE 510 corresponds to 3 different patterns, indicated at 522, 526 and 530, that lead to 3 different target events TE 534, TE 538 and TE 542, respectively.

It will be appreciated that for each subsequent pre-event that is detected, the number of possible target events is reduced. Additionally, the likelihood that the user is in the process of executing a particular possible target event increases. Accordingly and as described in more detail below, as each pre-event is detected and a current position within a given pattern advances closer to a target event, a polling rate of a selected sensor may be increased to reduce latency. Further, until a subsequent pre-event is detected, the polling rate of a selected sensor may remain at a relatively lower rate to thereby conserve power and enhance battery life.

In one example and with reference also to FIG. 3, the adaptive event recognition program 14 may receive image data of the user's hand 304 making the generally U-shaped pose 316. The adaptive event recognition program 14 may determine that the generally U-shaped pose 316 matches PE 510 in FIG. 5. PE 510 is a member of patterns 522, 526 and 530.

Accordingly, the adaptive event recognition program 14 may advance to a Detect1 state 406 in which the polling rate of the selected sensor is increased to operate at a Faster F1 polling rate that is faster than the default polling rate of the Start state 402. For example, where the default polling rate is 1.0 Hz., the Faster F1 polling rate may be 10 Hz. The increased Faster F1 polling rate of the Detect1 state 406 also corresponds to increased power usage by the selected sensor, indicated as Higher P1, as compared to power usage of the Start state 402. The Faster F1 polling rate of the Detect1 state 406 also corresponds to a reduced potential latency, indicated as Reduced L1, that is less than the highest potential latency of the Start state 402.

For purposes of this disclosure, a potential latency of a sensor operating at a given polling rate is defined as a maximum potential time period between the occurrence of an event, such as a pre-event or a target event, and the detection of the event occurrence by the sensor. For example, where a sensor polling rate is 1 Hz., a potential latency associated with this polling rate may be approximately 0.99 secs. In other words, approximately 0.99 secs would be the maximum potential elapsed time between the occurrence of an event, such as a pre-event or a target event, and the detection of the event occurrence by the sensor. Accordingly, increasing a sensor's polling rate correspondingly decreases the potential latency of that sensor. It will also be appreciated that in some examples, the actual latency between the occurrence of an event and the detection of the event occurrence by the sensor will be less than the potential latency of that sensor operating.

From the Detect1 state 406, the adaptive event recognition program 14 may receive image data of the user's hand 304 making a modified U-shaped pose 320 in which the index finger 308 and thumb 312 are closer together than in previous pose 316. The adaptive event recognition program 14 may determine that the modified U-shaped pose 320 matches PE 550 in FIG. 5. PE 550 is a member of patterns 522 and 526. Thus, the possible target events have been reduced to TE 534 and TE 538.

Accordingly, the adaptive event recognition program 14 may advance to a Detect2 state 410 in which the polling rate of the selected sensor is increased to operate at a Faster F2 polling rate that is faster than the Faster F1 polling rate of the Detect1 state 406. For example, where the Faster F1 polling rate is 10 Hz, the Faster F2 polling rate may be 60 Hz. The increased Faster F2 polling rate of the Detect2 state 410 also corresponds to increased power usage by the selected sensor, indicated as Higher P2, as compared to the Higher P1 power usage of the Detect1 state 406. The Faster F2 polling rate of the Detect2 state 410 also corresponds to a further reduced potential latency, indicated as Reduced L2, that is less than the Reduced L1 potential latency of the Detect1 state 406.

From the Detect2 state 410, the adaptive event recognition program 14 may receive image data of the user's hand 304 making a near-pinching pose 324 in which the index finger 308 and thumb 312 are separated by a smaller distance, such as approximately 2 mm., as compared to the modified U-shaped pose 320. The adaptive event recognition program 14 may determine that the near-pinching pose 324 matches PE 554 in FIG. 5. PE 554 is a member of pattern 522. Thus, the possible target events have now been reduced to a single target event, TE 534.

Accordingly, the adaptive event recognition program 14 may advance to a Detect3 state 414 in which the polling rate of the selected sensor is increased to operate at a Faster F3 polling rate that is faster than the Faster F2 polling rate of the Detect2 state 410. For example, where the Faster F2 polling rate is 60 Hz, the Faster F3 polling rate may be 120 Hz. The increased Faster F3 polling rate of the Detect3 state 414 also corresponds to increased power usage by the selected sensor, indicated as Higher P3, as compared to the Higher P2 power usage of the Detect2 state 410. The Faster F3 polling rate of the Detect3 state 414 also corresponds to a further reduced potential latency, indicated as Reduced L3, that is less than the Reduced L2 potential latency of the Detect2 state 410.

From the Detect3 state 414, the adaptive event recognition program 14 may receive image data of the user's hand 304 making the pinching pose 330 in which the index finger 308 and thumb 312 are touching, as indicated by the Target Event 534 Occurred state 418. The adaptive event recognition program 14 may determine that the pinching pose 330 matches selected target event TE 534 in FIG. 5. The adaptive event recognition program 14 may then provide feedback associated with the selected target event TE 534 to the user via the HMD device 42.

With reference to FIGS. 4 and 5, in some examples the adaptive event recognition program 14 may be configured to reduce the polling rate of the selected sensor where user-related information 52 corresponding to a pre-event is not received within a predetermined timeframe. For example, when the Detect1 state is initiated the adaptive event recognition program 14 may start a timer. If user-related information 52 corresponding to one of the next possible pre-events PE 550 and PE 552 is not received within a predetermined timeframe, then the adaptive event recognition program 14 may effect a timed out condition and revert to the Start state 402 corresponding to the slower, Default polling rate and lowest power usage.

Similar time out conditions may be utilized for the Detect2 and/or Detect3 states. Advantageously, in this manner power consumption may be reduced when a probability of receiving a next possible pre-event falls below a predetermined threshold that corresponds to the predetermined timeframe. In one example, the predetermined timeframes for a time out condition may be 3 secs. for the Detect1 state, 2 secs for the Detect2 state, and 1.0 sec for the Detect3 state. It will be appreciated that any suitable predetermined timeframes and predetermined probability thresholds may be utilized.

Advantageously, by maintaining sensor polling rates at slower rates until a pre-event is detected, the adaptive event recognition system 10 minimizes power usage by the sensor as well as bandwidth consumption of sensor signals. For example, by waiting to operate the sensor at the highest Faster F3 polling until PE 554 is detected, the highest Higher P3 power usage state may be avoided until a probability of the selected target event occurring exceeds a predetermined threshold.

Additionally, the adaptive event recognition system 10 sequentially increases the polling rate of the selected sensor as additional pre-events are detected. In this manner and as illustrated in FIG. 3, the corresponding potential latencies between the occurrence and detection of a pre-event are sequentially reduced. Furthermore, by operating the sensor at the highest Faster F3 polling rate upon detecting PE 554, the adaptive event recognition system 10 also minimizes potential latency between the occurrence of the selected target event TE 534 and detecting the event.

In another example, prior to detecting the selected target event 534, the adaptive event recognition program 14 may pre-fetch at least a portion of the feedback 78 associated with one or more target events. For example, at the Detect2 state 410, which corresponds to PE 550 in FIG. 5, there are two possible patterns 522 and 526 and two possible target events TE 534 and TE 538, respectively, remaining. In this example, at the Detect2 state 410 the adaptive event recognition program 14 may pre-fetch a portion of the feedback 78 associated with both TE 534 and TE 538. In one example, 50% of the feedback 78 associated with both TE 534 and TE 538 may be pre-fetched. It will be appreciated that any suitable portion of feedback may be pre-fetched. In some examples, 100% of the feedback may be pre-fetched.

For example, where TE 534 corresponds to a shutter release command for a camera application, the adaptive event recognition program 14 may pre-fetch 50% of the data associated with the command and 50% of the image data that will be provided to the user via the HMD device 42 to indicate that an image has been captured. Similarly, where TE 538 corresponds to a zoom command for the camera application, the adaptive event recognition program 14 may pre-fetch 50% of the data associated with the zoom command and 50% of the image data that will be provided to the user via the HMD device 42 to indicate that the camera is zooming.

In other examples, the adaptive event recognition program 14 may pre-fetch at least a portion of the feedback 78 associated with one or more target events at other points in time that temporally precede the one or more target events along timeline 302. For example, the adaptive event recognition program 14 may pre-fetch at least a portion of feedback at the Detect3 state 414, which corresponds to PE 554 in FIG. 5, or at the Detect1 state 406, which corresponds to PE 510 in FIG. 5.

In another example, where user-related information 52 matches a predictive pre-event that is not the selected target event, the adaptive event recognition program 14 may be configured to determine an estimated execution time at which the selected target event will occur. For example, from the Detect2 state 410 the adaptive event recognition program 14 may receive user-related information 52 that matches PE 554. PE 554 may be a predictive pre-event that corresponds to a predetermined likelihood that target event TE 534 will subsequently occur.

With reference to FIG. 3, after matching the user-related information 52 with the predictive pre-event PE 554, the adaptive event recognition program 14 may determine a Target Event 534 Estimated Execution Time at which the target event 534 will occur. In one example, the Target Event 534 Estimated Execution Time may be determined by accessing a predetermined estimated time gap, illustrated at 340 in FIG. 3, between the detection of PE 554 and the occurrence of the target event 534. As shown in FIG. 3, by adding the estimated time gap 340 to the actual time at which the pre-event 554 was detected, the Target Event 534 Estimated Execution Time may be determined.

Using the Target Event 534 Estimated Execution Time, the adaptive event recognition program 14 may provide feedback 78 associated with the selected target event to the user either at the Target Event 534 Estimated Execution Time or prior to the Target Event 534 Estimated Execution Time. In one example, the feedback 78 may be provided at the Target Event 534 Estimated Execution Time which may closely correspond to the actual time that the target event TE 534 occurs. Advantageously, in this manner the user may experience a perceived latency that is effectively zero or perhaps negligible.

In another example, the feedback 78 may be provided prior to the Target Event 534 Estimated Execution Time by a predetermined time period. Advantageously, in this example the user may experience a negative perceived latency in which the feedback 78 is perceived by the user before the target event TE 534 is completed. In some examples, this may provide the user with a heightened experience of real-time interaction with the HMD device 42 and adaptive event recognition system 10. In some examples, providing the feedback 78 prior to the Target Event 534 Estimated Execution Time may also be utilized to offset processing and/or other system delays and latencies that may be associated with providing the feedback to the user via the HMD device 42. In this manner, the latency associated with the feedback 78 that is perceived by the user may be minimized.

In the examples described above, it will be appreciated that any suitable sensor polling rates and temporal progression of increased polling rates may be utilized. Similarly, any suitable poses, gestures, or other hand movements may be designated as pre-events and target events.

As noted above, it will also be appreciated that various other sensors systems may detect various other forms of user-related information 52, and HMD device 42 may provide such information to the adaptive event recognition program 14. Such information may be correlated with other pre-events, patterns, and associated target events that relate to the information.

It will also be appreciated that the pre-events and patterns of FIG. 5 may be determined empirically through laboratory studies, user studies or any other suitable methods. Estimated time gaps between the occurrence of pre-events and the execution of target events may be similarly determined through laboratory studies, user studies or any other suitable methods. Where a selected target event is predicted, a threshold probability of the selected target event occurring following a penultimate pre-event may be utilized to decrease the occurrence of prediction errors. In some examples, pre-events, target events, patterns, and estimated time gaps may be stored in mass storage 18 of computing device 22 or at a remote source that is accessed via network 16.

Figure 6A:
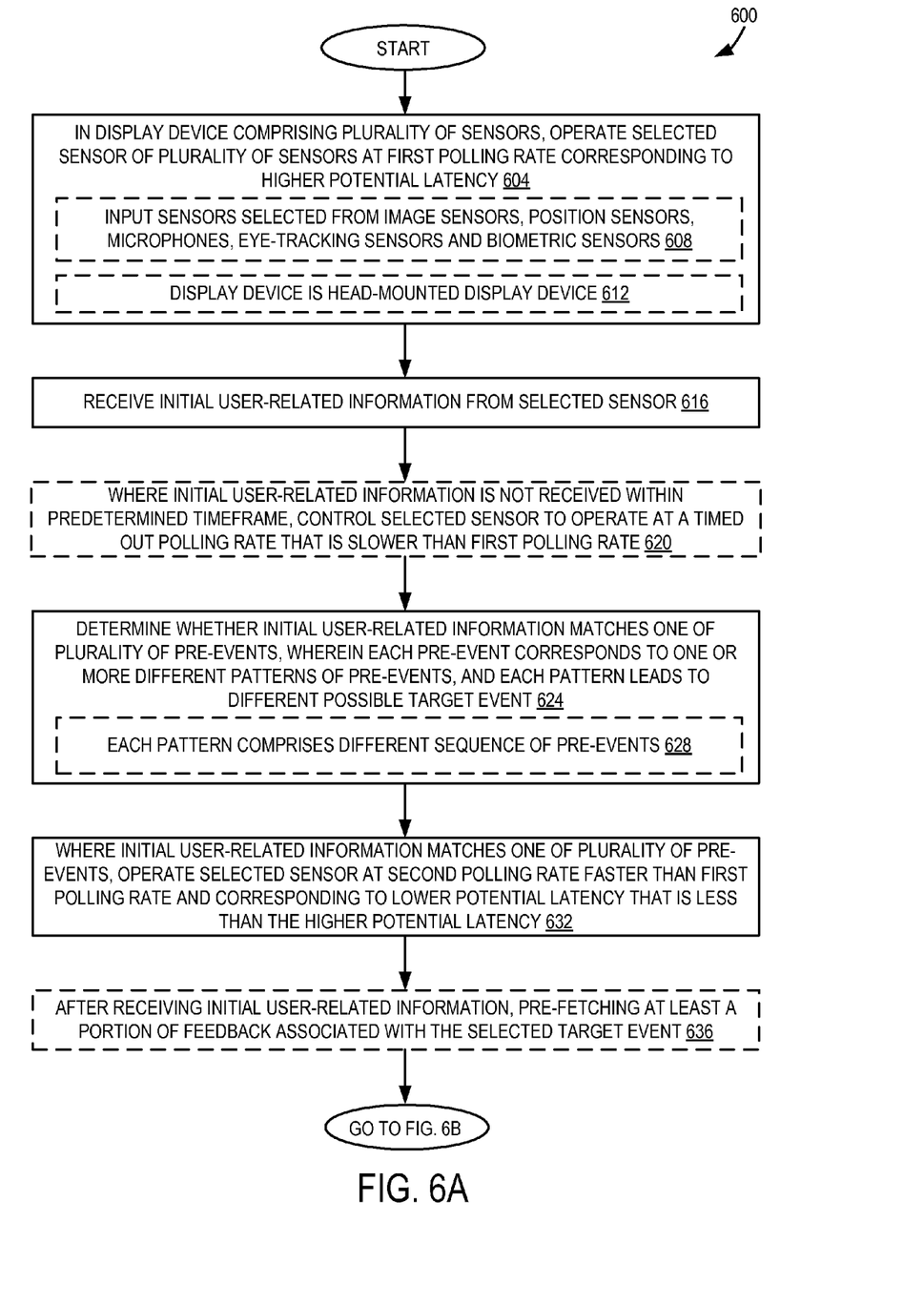
FIGS. 6A and 6B are a flow chart of a method for recognizing a selected target event according to an embodiment of the present disclosure.
Figure 6B:
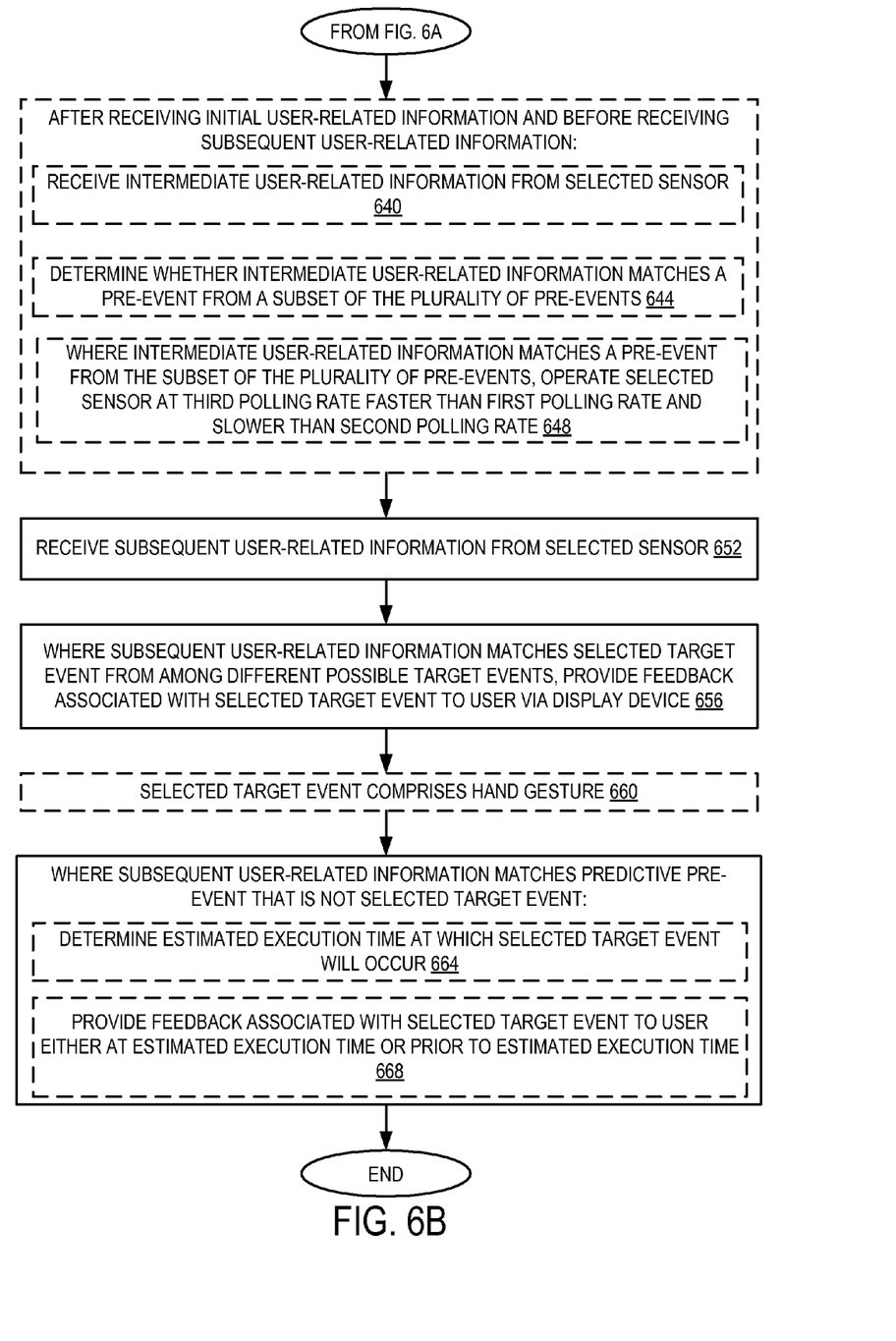

FIGS. 6A and 6B illustrate a flow chart of a method 600 for recognizing a selected target event according to an embodiment of the present disclosure. The following description of method 600 is provided with reference to the software and hardware components of the adaptive event recognition system 10 described above and shown in FIGS. 1 and 2. It will be appreciated that method 600 may also be performed in other contexts using other suitable hardware and software components.

With reference to FIG. 6A, at 604 the method 600 includes, in a display device comprising a plurality of sensors, operating a selected sensor of the plurality of sensors at a first polling rate corresponding to a higher potential latency. At 608 the plurality of input sensors may be selected from image sensors, position sensors, microphones, eye-tracking sensors, and biometric sensors. At 612 the display device is a head-mounted display device.

At 616 the method 600 may include receiving initial user-related information from the selected sensor. At 620, where the initial user-related information is not received within a predetermined timeframe, the method 600 may include controlling the selected sensor to operate at a timed out polling rate that is slower than the first polling rate. At 624 the method 600 may include determining whether the initial user-related information matches one of a plurality of pre-events, wherein each of the pre-events corresponds to one or more different patterns of pre-events, and each of the patterns leads to a different possible target event. At 628, each of the patterns may comprise a different sequence of the pre-events.

At 632, where the initial user-related information matches one of the plurality of pre-events, the method 600 may include operating the selected sensor at a second polling rate that is faster than the first polling rate and that corresponds to a lower potential latency that is less than the higher potential latency. At 636, after receiving the initial user-related information, the method 600 may include pre-fetching at least a portion of the feedback associated with the selected target event.

With reference now to FIG. 6B, after receiving the initial user-related information and before receiving subsequent user-related information, at 640 the method 600 may include receiving intermediate user-related information from the selected sensor. At 644 the method 600 may include determining whether the intermediate user-related information matches a pre-event from a subset of the plurality of pre-events. At 648, where the intermediate user-related information matches a pre-event from the subset of the plurality of pre-events, the method 600 may include operating the selected sensor at a third polling rate that is faster than the first polling rate and is slower than the second polling rate.

At 652 the method 600 may include receiving subsequent user-related information from the selected sensor. At 656, where the subsequent user-related information matches the selected target event from among the different possible target events, the method 600 may include providing feedback associated with the selected target event to the user via the display device. At 660 the selected target event may comprise a hand gesture. At 664, where the subsequent user-related information matches a predictive pre-event that is not the selected target event, the method 600 may include determining an estimated execution time at which the selected target event will occur. At 668, the method may include providing the feedback associated with the selected target event to the user either at the estimated execution time or prior to the estimated execution time.

It will be appreciated that method 600 is provided by way of example and is not meant to be limiting. Therefore, it is to be understood that method 600 may include additional and/or alternative steps than those illustrated in FIGS. 6A and 6B. Further, it is to be understood that method 600 may be performed in any suitable order. Further still, it is to be understood that one or more steps may be omitted from method 600 without departing from the scope of this disclosure.

Figure 7:
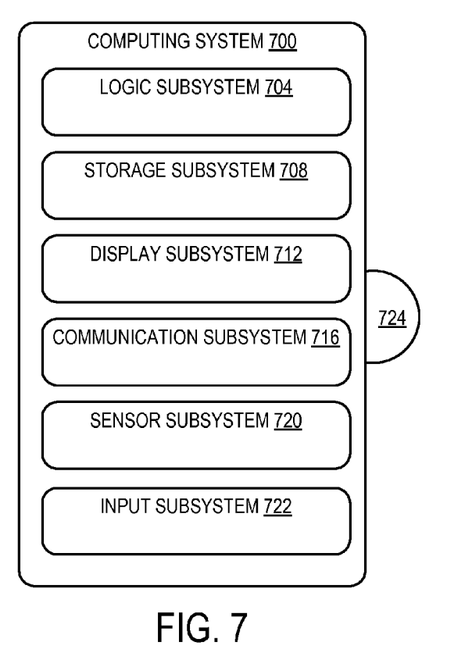
FIG. 7 is a simplified schematic illustration of an embodiment of a computing device.

FIG. 7 schematically shows a nonlimiting embodiment of a computing system 700 that may perform one or more of the above described methods and processes. Computing device 22 may take the form of computing system 700. Computing system 700 is shown in simplified form. It is to be understood that virtually any computer architecture may be used without departing from the scope of this disclosure. In different embodiments, computing system 700 may take the form of a mainframe computer, server computer, desktop computer, laptop computer, tablet computer, home entertainment computer, network computing device, mobile computing device, mobile communication device, gaming device, etc. As noted above, in some examples the computing system 700 may be integrated into an HMD device.

As shown in FIG. 7, computing system 700 includes a logic subsystem 704 and a storage subsystem 708. Computing system 700 may optionally include a display subsystem 712, a communication subsystem 716, a sensor subsystem 720, an input subsystem 722 and/or other subsystems and components not shown in FIG. 7. Computing system 700 may also include computer readable media, with the computer readable media including computer readable storage media and computer readable communication media. Computing system 700 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 704 may include one or more physical devices configured to execute one or more instructions. For example, the logic subsystem 704 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 704 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 708 may include one or more physical, persistent devices configured to hold data and/or instructions executable by the logic subsystem 704 to implement the herein described methods and processes. When such methods and processes are implemented, the state of storage subsystem 708 may be transformed (e.g., to hold different data).

Storage subsystem 708 may include removable media and/or built-in devices. Storage subsystem 708 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 708 may include devices with one or more of the following characteristics: volatile, nonvolatile, dynamic, static, read/write, read-only, random access, sequential access, location addressable, file addressable, and content addressable.

In some embodiments, aspects of logic subsystem 704 and storage subsystem 708 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 7 also shows an aspect of the storage subsystem 708 in the form of removable computer readable storage media 724, which may be used to store data and/or instructions executable to implement the methods and processes described herein. Removable computer-readable storage media 724 may take the form of CDs, DVDs, HD-DVDs, Blu-Ray Discs, EEPROMs, and/or floppy disks, among others.

It is to be appreciated that storage subsystem 708 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration.

Furthermore, data and/or other forms of information pertaining to the present disclosure may be propagated by a pure signal via computer-readable communication media.

When included, display subsystem 712 may be used to present a visual representation of data held by storage subsystem 708. As the above described methods and processes change the data held by the storage subsystem 708, and thus transform the state of the storage subsystem, the state of the display subsystem 712 may likewise be transformed to visually represent changes in the underlying data. The display subsystem 712 may include one or more display devices utilizing virtually any type of technology. Such display devices may be combined with logic subsystem 704 and/or storage subsystem 708 in a shared enclosure, or such display devices may be peripheral display devices. The display subsystem 712 may include, for example, the display system 56 and transparent display 54 of the HMD device 42.

When included, communication subsystem 716 may be configured to communicatively couple computing system 700 with one or more networks and/or one or more other computing devices. Communication subsystem 716 may include wired and/or wireless communication devices compatible with one or more different communication protocols. As nonlimiting examples, the communication subsystem 716 may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

Sensor subsystem 720 may include one or more sensors configured to sense different physical phenomenon (e.g., visible light, infrared light, sound, acceleration, orientation, position, etc.) and/or physiological processes, functions, measurements, and/or states as described above. For example, the sensor subsystem 720 may comprise one or more eye-tracking sensors, image sensors, microphones, motion sensors such as accelerometers, compasses, touch pads, touch screens, heart rate monitors, pulse oximeters, electrodermal response sensors, electroencephalographic (EEG) monitors, and/or any other suitable sensors.

In some embodiments sensor subsystem 720 may include a depth camera. The depth camera may include left and right cameras of a stereoscopic vision system, for example. Time-resolved images from both cameras may be registered to each other and combined to yield depth-resolved video. In other embodiments the depth camera may be a structured light depth camera or a time-of-flight camera, as described above. In some embodiments, sensor subsystem 720 may include a visible light camera, such as a digital camera. Virtually any type of digital camera technology may be used without departing from the scope of this disclosure. As a non-limiting example, the visible light camera may include a charge coupled device image sensor.

Sensor subsystem 720 may be configured to provide sensor data to logic subsystem 704, for example. As described above, such data may include eye-tracking information, image information, audio information, ambient lighting information, depth information, position information, motion information, user location information, biometric parameter information, and/or any other suitable sensor data that may be used to perform the methods and processes described above.

When included, input subsystem 722 may comprise or interface with one or more sensors or user-input devices such as a game controller, gesture input detection device, voice recognizer, inertial measurement unit, keyboard, mouse, or touch screen. In some embodiments, the input subsystem 722 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the adaptive event recognition system 10 that is implemented to perform one or more particular functions. In some cases, such a program may be instantiated via logic subsystem 704 executing instructions held by storage subsystem 708. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for recognizing a selected target event, comprising:
   in a display device comprising a plurality of sensors, operating a selected sensor of the plurality of sensors at a first polling rate corresponding to a higher potential latency;
   receiving initial user-related information from the selected sensor;
   determining whether the initial user-related information matches one of a plurality of pre-events, wherein each of the pre-events corresponds to one or more different patterns of pre-events, and each of the patterns leads to a different possible target event;
   where the initial user-related information matches one of the plurality of pre-events, operating the selected sensor at a second polling rate that is faster than the first polling rate and that corresponds to a lower potential latency that is less than the higher potential latency;
   receiving subsequent user-related information from the selected sensor;
   where the subsequent user-related information matches a selected target event from among the different possible target events, providing feedback associated with the selected target event to the user via the display device; and
   where the subsequent user-related information matches a predictive pre-event that is not the selected target event:

determining an estimated execution time at which the selected target event will occur; and providing the feedback associated with the selected target event to the user either at the estimated execution time or prior to the estimated execution time.

2. The method of claim 1, further comprising, after receiving the initial user-related information, pre-fetching at least a portion of the feedback associated with the selected target event.

3. An adaptive event recognition system, comprising:
a display device operatively connected to a computing device, the display device including a display system and a plurality of input sensors; and
an adaptive event recognition program executed by a processor of the computing device, the adaptive event recognition program configured to:
operate a selected sensor of the plurality of input sensors at a first polling rate corresponding to a higher potential latency;
receive initial user-related information from the selected sensor;
determine whether the initial user-related information matches one of a plurality of pre-events, wherein each of the pre-events corresponds to one or more different patterns of pre-events, and each of the patterns leads to a different possible target event;
where the initial user-related information matches one of the plurality of pre-events, operate the selected sensor at a second polling rate that is faster than the first polling rate and that corresponds to a lower potential latency that is less than the higher potential latency;
receive subsequent user-related information from the selected sensor; and
where the subsequent user-related information matches a selected target event from among the different possible target events, provide feedback associated with the selected target event to a user via the display device.

4. The adaptive event recognition system of claim 3, wherein the adaptive event recognition program is further configured to, where the subsequent user-related information matches a predictive pre-event that is not the selected target event:
determine an estimated execution time at which the selected target event will occur; and
provide the feedback associated with the selected target event to the user either at the estimated execution time or prior to the estimated execution time.

5. The adaptive event recognition system of claim 3, wherein the adaptive event recognition program is further configured to, after receiving the initial user-related information, pre-fetch at least a portion of the feedback associated with the selected target event.

6. The adaptive event recognition system of claim 3, wherein the display device is a head-mounted display device.

7. The adaptive event recognition system of claim 3, wherein the selected target event comprises a hand gesture.

8. The adaptive event recognition system of claim 3, wherein the adaptive event recognition program is further configured to:
after receiving the initial user-related information and before receiving the subsequent user-related information, receive intermediate user-related information from the selected sensor;
determine whether the intermediate user-related information matches a pre-event from a subset of the plurality of pre-events;

where the intermediate user-related information matches a pre-event from the subset of the plurality of pre-events, operate the selected sensor at a third polling rate that is faster than the first polling rate and is lower than the second polling rate.

9. The adaptive event recognition system of claim 3, wherein the adaptive event recognition program is further configured to, where the initial user-related information is not received within a predetermined timeframe, control the selected sensor to operate at a timed out polling rate that is slower than the first polling rate.

10. The adaptive event recognition system of claim 3, wherein each of the patterns comprises a different sequence of the pre-events.

11. The adaptive event recognition system of claim 3, wherein the plurality of input sensors are selected from the group consisting of image sensors, position sensors, microphones, eye-tracking sensors, and biometric sensors.

12. A method for recognizing a selected target event, comprising:
in a display device comprising a plurality of input sensors, operating a selected sensor of the plurality of input sensors at a first polling rate corresponding to a higher potential latency;
receiving initial user-related information from the selected sensor;
determining whether the initial user-related information matches one of a plurality of pre-events, wherein each of the pre-events corresponds to one or more different patterns of pre-events, and each of the patterns leads to a different possible target event;
where the initial user-related information matches one of the plurality of pre-events, operating the selected sensor at a second polling rate that is faster than the first polling rate and that corresponds to a lower potential latency that is less than the higher potential latency;
receiving subsequent user-related information from the selected sensor; and
where the subsequent user-related information matches the selected target event from among the different possible target events, providing feedback associated with the selected target event to a user via the display device.

13. The method of claim 12, further comprising, where the subsequent user-related information matches a predictive pre-event that is not the selected target event:
determining an estimated execution time at which the selected target event will occur; and
providing the feedback associated with the selected target event to the user either at the estimated execution time or prior to the estimated execution time.

14. The method of claim 12, further comprising, after receiving the initial user-related information, pre-fetching at least a portion of the feedback associated with the selected target event.

15. The method of claim 12, wherein the display device is a head-mounted display device.

16. The method of claim 12, wherein the selected target event comprises a hand gesture.

17. The method of claim 12, further comprising:
after receiving the initial user-related information and before receiving the subsequent user-related information, receiving intermediate user-related information from the selected sensor;
determining whether the intermediate user-related information matches a pre-event from a subset of the plurality of pre-events;

where the intermediate user-related information matches a pre-event from the subset of the plurality of pre-events, operating the selected sensor at a third polling rate that is faster than the first polling rate and is lower than the second polling rate.

18. The method of claim 12, further comprising, where the initial user-related information is not received within a predetermined timeframe, controlling the selected sensor to operate at a timed out polling rate that is slower than the first polling rate.

19. The method of claim 12, wherein each of the patterns comprises a different sequence of the pre-events.

20. The method of claim 12, wherein the plurality of input sensors are selected from the group consisting of image sensors, position sensors, microphones, eye-tracking sensors, and biometric sensors.

* * * * *